US008683384B2

(12) United States Patent
De Luca

(10) Patent No.: US 8,683,384 B2
(45) Date of Patent: Mar. 25, 2014

(54) LIVE ACTION ICONS FOR THE INTERNET

(75) Inventor: G. Mercedes De Luca, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 454 days.

(21) Appl. No.: 12/539,566

(22) Filed: Aug. 11, 2009
(Under 37 CFR 1.47)

(65) Prior Publication Data
US 2011/0041169 A1 Feb. 17, 2011

(51) Int. Cl.
*G06F 3/048* (2013.01)
(52) U.S. Cl.
USPC ........... 715/835; 715/733; 715/738; 715/760; 705/27.1
(58) Field of Classification Search
USPC ......... 715/733, 764, 765, 810, 835, 760, 769, 715/804, 719, 738, 748; 705/27.1; 707/705
See application file for complete search history.

(56) References Cited

U.S. PATENT DOCUMENTS

| 7,730,401 | B2* | 6/2010 | Gillespie et al. | 715/702 |
|---|---|---|---|---|
| 2002/0075309 | A1* | 6/2002 | Michelman et al. | 345/764 |
| 2002/0186255 | A1* | 12/2002 | Shafron et al. | 345/810 |
| 2003/0009768 | A1* | 1/2003 | Moir | 725/112 |
| 2007/0033169 | A1* | 2/2007 | Friedman | 707/3 |

\* cited by examiner

Primary Examiner — Xiomar L Bautista
(74) Attorney, Agent, or Firm — Martine Penilla Group, LLP

(57) ABSTRACT

Live action icons for the Internet which allow "functionality" and "actions" to occur wherever the user might intuitively think there is an "action" to be had or done. It may enable users to interact with various websites with a set of live action icons, each of which may be used to perform a certain function. One of the live action icons may be used to display the login interface of a website. Another live action icon may be used for online shopping. The live action icons may speed up the interaction between users and websites, saving users time for looking up a function button on a webpage or repeatedly inputting user information.

20 Claims, 4 Drawing Sheets

LIVE ACTION ICONS FOR THE INTERNET

BACKGROUND

1. Field of the Invention

The present invention relates generally to the Internet, and more particularly to a method for facilitating users to interact with the Internet.

2. Description of Related Art

The explosive growth of the Internet makes life much easier. Users may access all types of information and finish various kinds of transactions from home. However, existing interfaces to the Internet are not very user friendly.

For example, many websites provide services to registered users, and users may click on a login button to go to a login page and then input their login information. However, different websites may place their login buttons at different locations on a webpage, and some Web pages are so long that their login buttons are not always on the screen a user is currently viewing, so users may have to spend time on finding where the login button is. Some websites display their login buttons only on their homepages. If a user is in the middle of browsing, he/she may have to go all way back to the home page to find the login button.

In another example, to do online shopping, users have to learn each website's buying process. Users may also have to input their credit card and address information at each of the numerous business-to-consumer websites. While users may enjoy the convenience of shopping from home, learning the buying process and inputting credit card and shipping address information repeatedly may be time consuming and require a lot of attention.

Therefore, it may be desirable to provide a method and user interface to facilitate users to interact with various websites easily and conveniently.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides an easy paradigm for less technical savvy users. It may allow "functionality" and "actions" to occur wherever a user might intuitively think there is an "action" to be had or done. It may enable users to interact with various websites with one set of live action icons, each of which may be used to perform a certain function. One of such live action icons may be used to enable users to conveniently input login information. A user may simply drag a "login" live action icon to the Web page he/she is currently viewing. Another live action icon may be used for online shopping. A user may drop a "shopping bag" live action icon onto an item he/she is interested in to get information about it and then use his/her credit card and shipping address information stored in the "shopping bag" live action icon to purchase the item. The live action icons may speed up the interaction between users and websites, saving users' time on looking up a function button on a Web page or repeatedly inputting user information. Advantages of the present invention will become apparent from the following detailed description.

The invention may be carried out by computer-executable instructions, such as program modules. The invention may involve two elements interacting with each other: a live action icon requesting a Web page to perform a function and a Web page performing the function in response to the request. The live action icons are generic tools and may be used with any website, any browser and any operating system.

Figure 1:
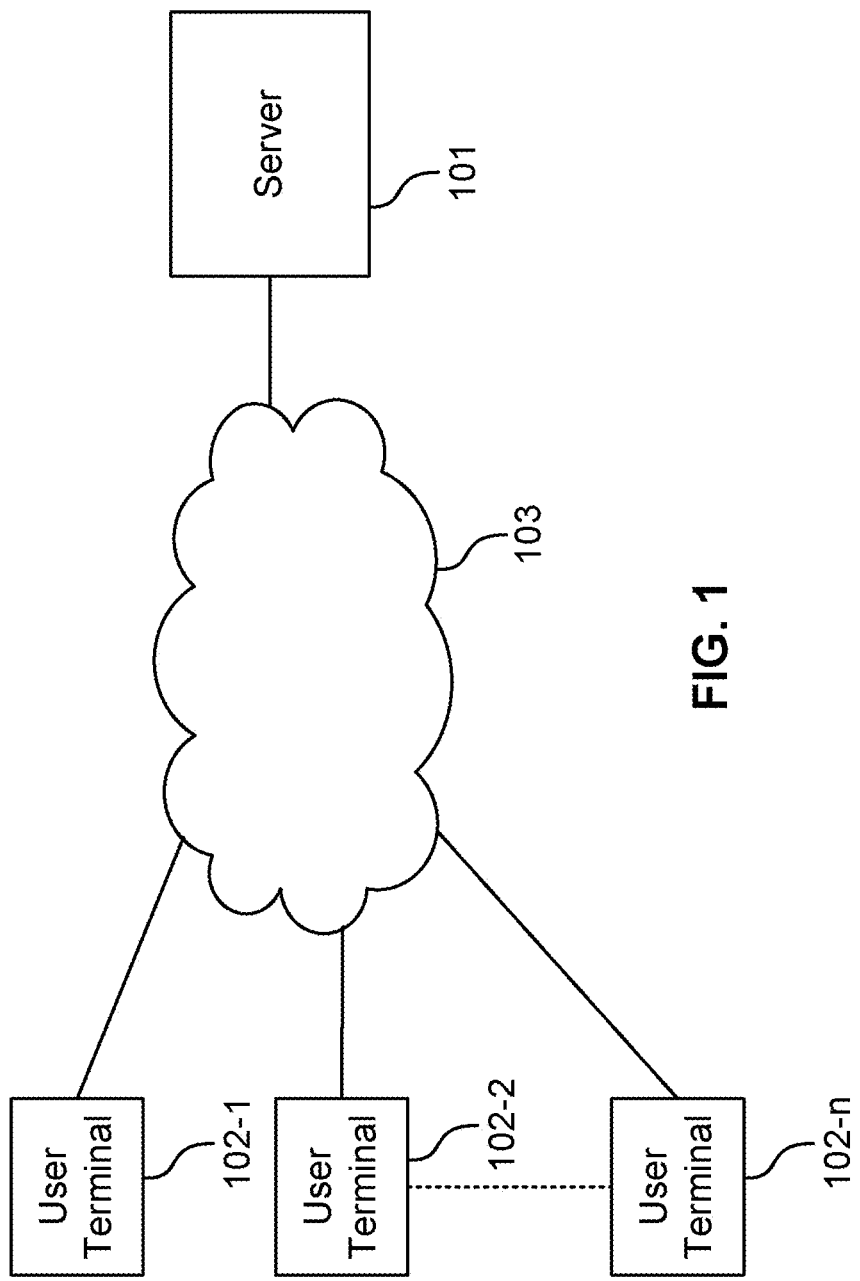
FIG. 1 illustrates an exemplary environment in which the method of the present invention may be used.

FIG. 1 illustrates an exemplary environment in which the method of the present invention may be used. As shown, a server 101 may communicate over a network 103 with a number of user terminals, or browsing devices, 102-1, 102-2, . . . 102-n. The server 101 may be a computer system, which may include one or more of a screen, an input device, a processing unit, a system memory, and a system bus coupling various components in the computer system. A computer program product comprises a computer-readable medium containing program code for performing the method of one embodiment.

The user terminals 102 may be personal computers, handheld devices (including cell phones), laptop devices, microprocessor-based systems, set top boxes, or programmable consumer electronics. Each user terminal may have a Web browser configured to receive and display web pages, which may include text, graphics, multimedia, etc. The web pages may be based on, e.g., HyperText Markup Language (HTML) and/or a Wireless Application Protocol (WAP). The Web browser may allow a user to customize the appearance of web pages.

Figure 2:
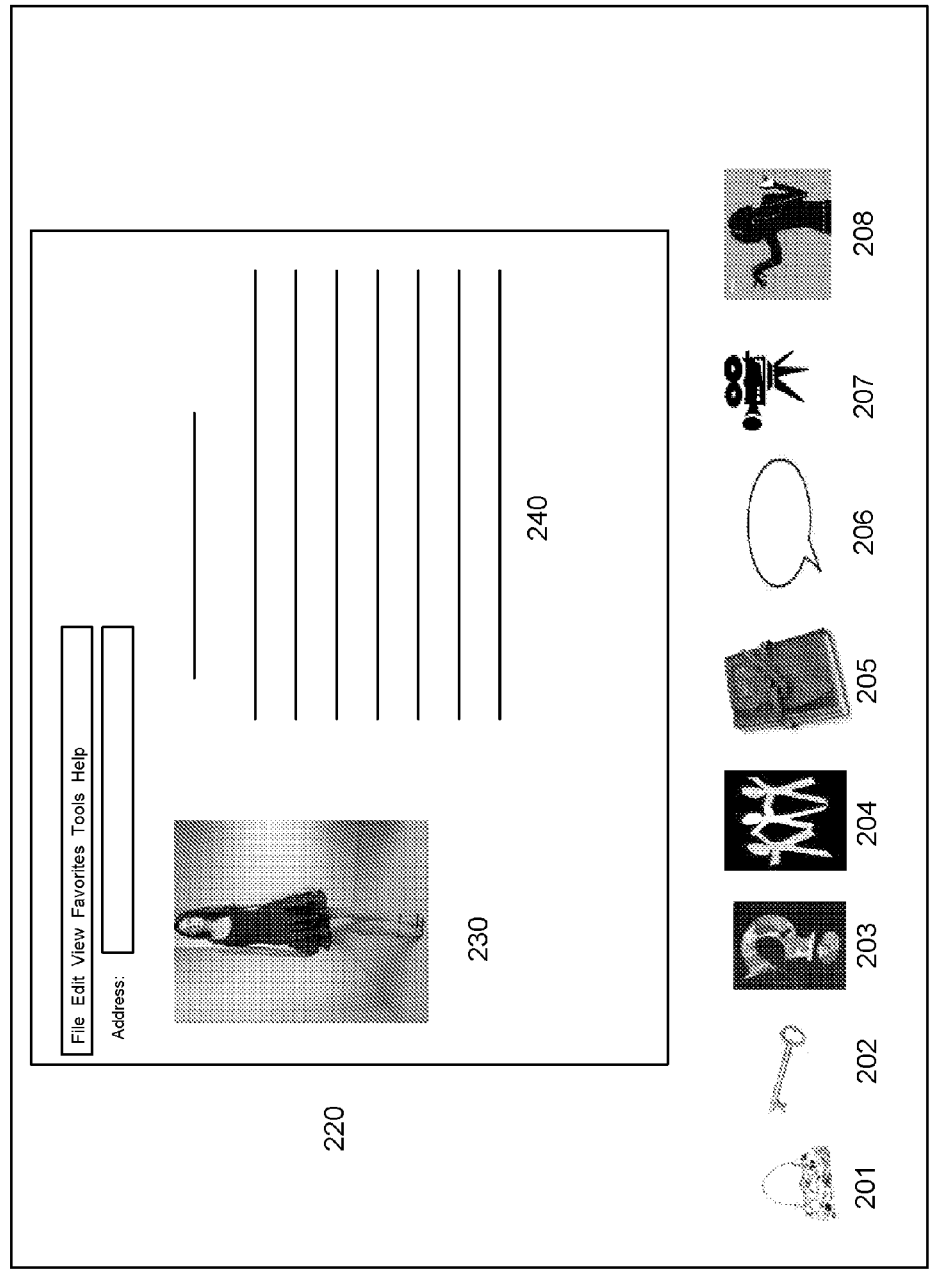
FIG. 2 shows a user interface with live action icons according to one embodiment of the present invention.

FIG. 2 shows a user interface supporting live action icons according to one embodiment of the present invention. The user interface may display a Web page 220 showing a picture of an actress Joyce 230 and comments on her new movie 240. The user interface may also display a number of live action icons 201-208. A live action icon may be a small program module which may interact with a live-action-icon-enabled Web page to request the Web page to perform a certain function, and/or store some frequently used information. When a live action icon is dropped onto a Web page, for example, near an item in which the user is interested and/or about which the user wants to do something, the Web page may respond by performing the function requested by the live action icon, and/or applying the information stored in the live action icon. The live action icons may be delivered to a user over the Internet, so that the user may install them onto a desktop of a computer, as shown in FIG. 2, or into a browser. The user may also save the live action icons in a portable memory device, so that they can be used with multiple browsers or on multiple computers. Live action icons may be written with various programming languages. One example of the programming language is JavaScript.

As discussed in more detail below, a shopping bag icon 201 may represent a request for detailed information about goods displayed on the Web page 220, a login icon 202 may represent a request for the login interface of a website, a "?" icon 203 may represent a request for a question-answer interface about content of the Web page 220, a community icon 204 may represent a look for user groups related to the content of the Web page 220, a scrapbook icon 205 may represent a request copying content of the Web page 220 into a user's preference folder, a Blog icon 206 may represent a request for a Blog page about the content of the Web page 220, a video icon 207 may represent a request displaying video clips embedded in the Web page 220, and a Podcast icon 208 may represent a request downloading a file from the Web page 220.

FIG. 2 only shows some examples of live action icons. It should be understood that the user interface may include more or fewer live action icons. For example, a user looking for a house may use a mortgage icon to get mortgage information, or a user searching for an air ticket may use a seat icon to find out available seats on a flight in which he/she is interested.

The live action icons are shown at the bottom of a screen in FIG. 2. It should be understood that a user may place the live action icons according to his/her preference. In one embodiment, a user may put live action icons frequently used in a tool belt, and put the tool belt on a user interface at any location convenient to him/her.

Figure 3:
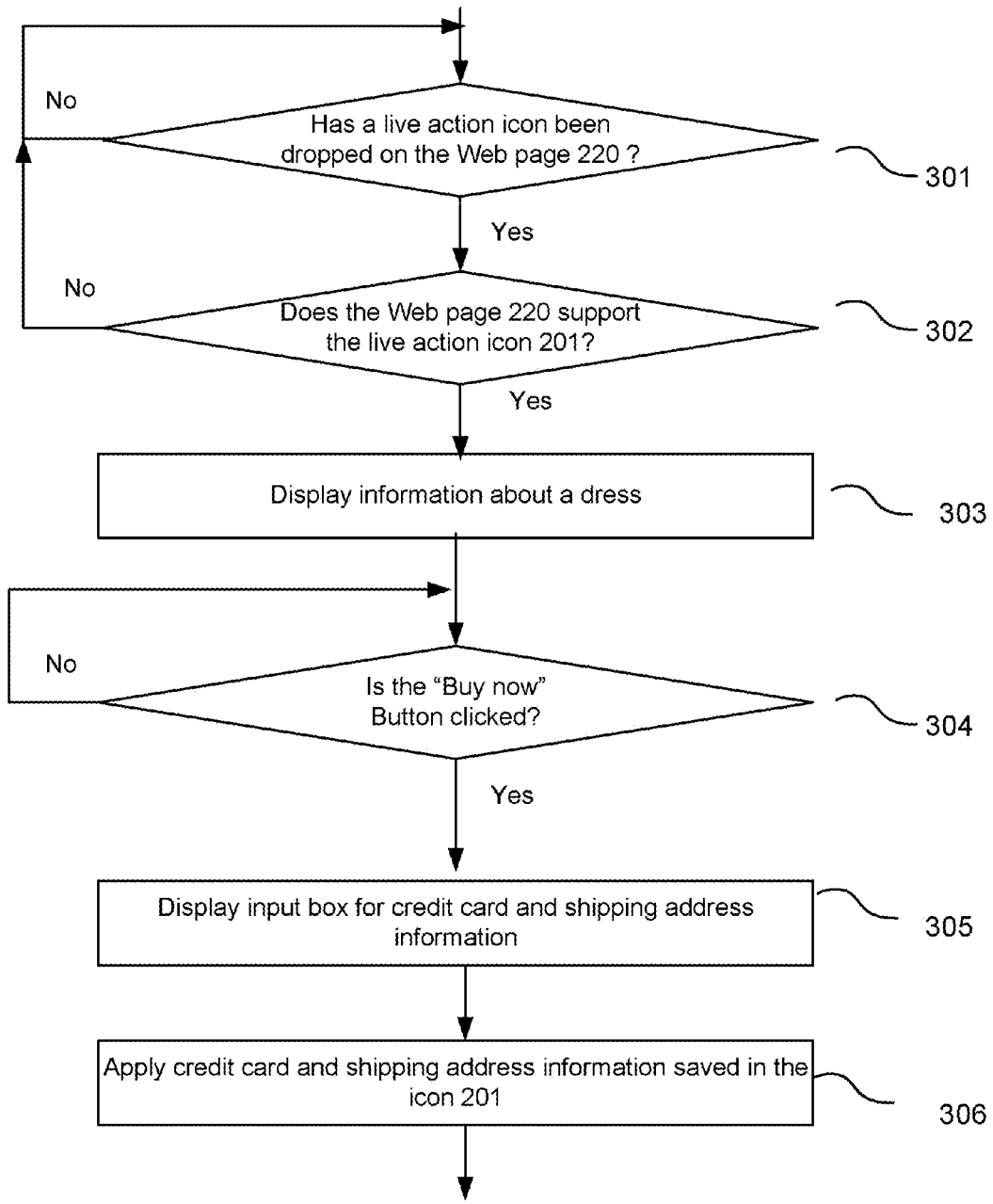
FIG. 3 shows a flow chart of a method for using a live action icon to interact with a Web page according to one embodiment of the present application.

FIG. 3 illustrates a flow chart of a method for using a live action icon to interact with a Web page according to one embodiment of the present invention. In one embodiment, a user may like the dress Joyce is wearing and want to find more information about the dress. The user may drag the shopping bag icon 201 and drop it on Joyce's dress on the Web page.

At 301, it may be decided whether a live action icon has been dropped onto the Web page 220. If not, it may continue to wait.

At 302, it may be decided whether the Web page 220 supports the function requested by the shopping bag icon 201. If it does not, the process may return to 301. In one embodiment, if the Web page 220 supports the shopping bag icon 201, the picture 230 may light up. Of course, the icon 201 also could light up, or some other indication that the Web page supports the live action icon would be possible.

At 303, if the Web page 220 supports the function requested by the shopping bag icon 201, the Web page may perform the function. In one embodiment, a small window may be presented on the Web page 220, and information about the dress may be displayed in the small window. The information may include, e.g., the brand, price and available sizes and colors of the dress. The small window may also include a "Buy now" button. Among other alternatives, another tab on the browser may be activated, or an entirely new browser window may be activated.

It should be understood that 301 and 302 are optional. In one embodiment, the Web page 220 may directly perform the requested function upon receiving the request from the shopping bag icon 201, for example, when the user positions a cursor over the icon when the Web page 220 is open, or clicks on the icon when the Web page 220 is open, without having to drag the icon over the Web page.

In one embodiment, instead of displaying a small window on the Web page 220, a Web page of a seller of the dress may be displayed. This may be accomplished by embedding a link to the seller's Web page into the Web page 220, and specifically, the picture 230. In one embodiment, price and availability information about the dress from several sellers may be displayed, so that the user can compare before purchasing.

At 304, it may be decided whether the user has clicked on the "Buy now" button. If not, it may continue to wait. In one embodiment, the small window may have a "Close" button.

If the "Buy now" button is clicked, at 305, a box for credit card (or other payment) information, a box for shipping address and a "Check out" button may be displayed in the small window. In one embodiment, the user may have previously saved information about a credit card (or other payment information) and a shipping address in the shopping bag icon 201. If the user clicks the "Check out" button, the saved payment and shipping address information may be automatically applied at 306, and the process may return to 301. In one embodiment, a user may save into the shopping bag icon 201 information about more than one credit card or payment alternative and more than one shipping address, and choose one before checking out.

Without the shopping bag icon 201, the user may have no clue about where to buy Joyce's dress. The shopping bag icon 201 may help the user to easily get information about an item in which he/she is interested. At the same time, by embedding information about the dress into Joyce's picture, sellers may have a more direct and more efficient channel for presenting their products to users. Since the information about the dress is displayed only upon a user's request, it is not perceived as advertising and does not irritate users. It should be understood that a content provider, the owner or designer of the Web page 220 in this embodiment, may embed information about a number of items into the Web page 220, e.g., information about Joyce's shoes or accessories (such as jewelry).

In addition, by storing and automatically applying a user's payment and shipping address information, the shopping bag icon 201 may save the user the time and effort of repeatedly inputting such information. The shopping bag icon is not website specific. If the user wants to buy a book shown on another website, he/she may drag the shopping bag icon 201 and drop it on the book.

Figure 4:
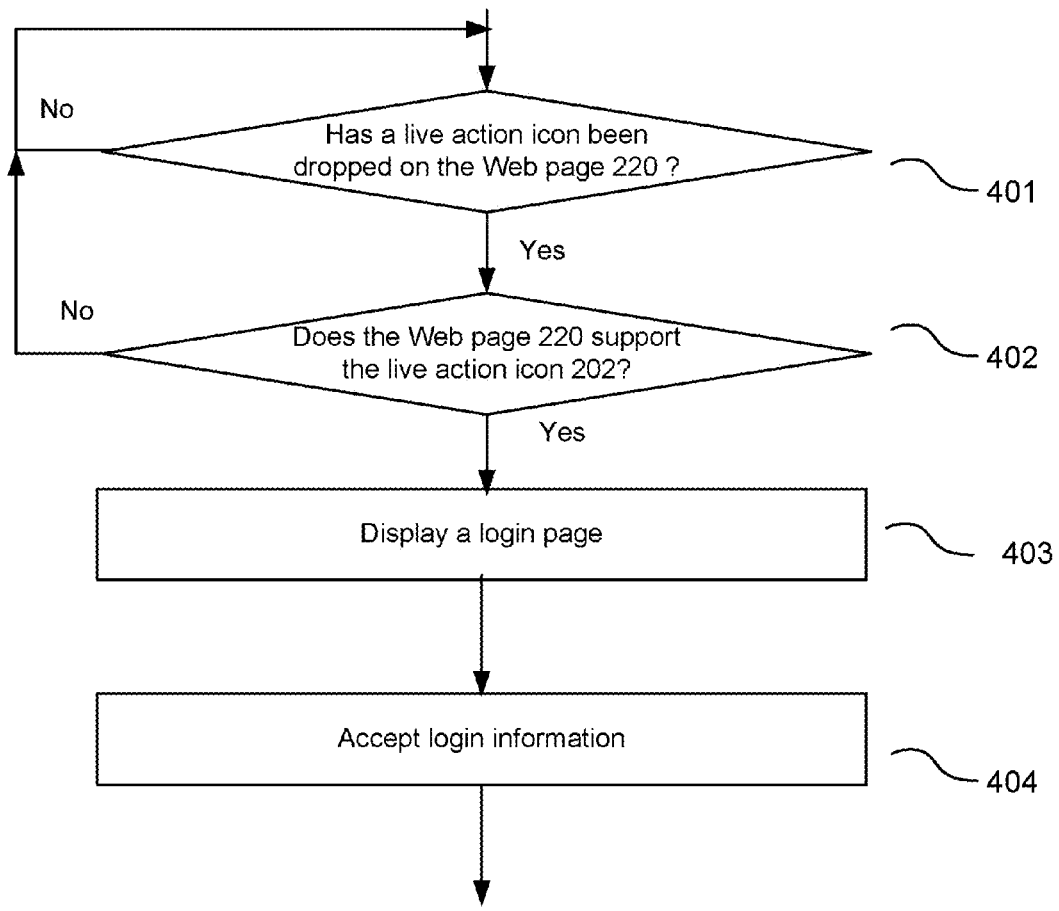
FIG. 4 shows a flow chart of a method for using a live action icon to interact with a Web page according to one embodiment of the present application.

FIG. 4 illustrates a flow chart of a method for using a live action icon to interact with a Web page according to one embodiment of the present invention. A user may be a fan of the actress Joyce and may decide to join Joyce's fan club while looking at the Web page 220. Joyce's fan club may be, e.g., a Yahoo!™ group. The user may simply drop the login icon 202 at Joyce's picture 230.

At 401, it may be decided whether a login icon 202 has been dropped onto the Web page 220. If not, it may continue to wait.

At 402, it may be decided whether the Web page 220 supports the function requested by the login icon 202. If it does not, the process may return to 401.

If the website supports the function requested by the login icon 202, at 403, a small window may be presented on the Web page 220, and a box for user name, a box for password, a "Sign in" button and a "Sign up" button may be displayed in the small window.

At 404, the user may click on the "Sign up" button and provide information required for signing up the group.

In one embodiment, the user is already a member of Joyce's fan club, and has saved his/her login information in the login icon 202. If the user clicks the "Sign in" button, the saved login information may be automatically applied at 404, and the process may return to 401. In another embodiment, the user may have stored login information for a number of websites in the login icon 202, and may select the one for Joyce's fan club before clicking the "Sign in" button. Accordingly, the login icon 202 may help the user to get to the login interface to Joyce's fan club quickly, and may save the user the time and effort of inputting the user's login information. The login icon is not website specific. If the user wants to login another website, he/she may drag the login icon and drop it on a Web page of that website.

In one embodiment, when the user wants to log out, instead of looking for a log out button, the user may simply drag the login icon 202 out of the Web page 220.

In one embodiment, if a user has a question about content of the Web page 220, e.g., other movies Joyce has starred, the user may move and drop the "?" icon 203 on the Web page 220. In response, a small window including a search box may be displayed. The user may input his/her question, and the search result may then be displayed. The search result may be a list of links relevant to the question. The "?" icon 203 may save the user the effort of going to the Web page of a search engine.

In one embodiment, if a user wants to see a trailer of Joyce's new movie, the user may move and drop the video icon 207 on the Web page 220. In one embodiment, if several trailers are embedded into the Web page 220, a small window may be presented to show information about these trailers, and the user may pick the one in which he/she is interested. In one embodiment, if the Web page 220 supports the video icon 207, it may light up when the video icon 207 is moved onto the Web page 220.

Similarly, if a user wants to know other comments on Joyce's new movie, the user may move the community icon 204 onto the Web page 220. If a user wants to capture the content of the Web page 220 and save it into the user's preference folder, he/she may move and drop the scrapbook icon 205 onto the Web page 220. If the user has more than one preference folder, a small window may pop up to ask which folder the user wants the content of the Web page 220 to go to. If a user wants to comment on Joyce's new movie, the user may move and drop the Blog icon 206 onto the Web page 220. If a user wants to download a trailer of the new movie, the user may move and drop the Podcast icon 208 onto the Web page 220. It should be understood that the Web page 220 may be programmed to support as many live action icons as possible.

Accordingly, instead of requiring users to go through various Web pages and menus, the present invention provides action oriented icons which match actions users frequently take on a Web page, and program the Web pages to interact with the icons.

In all of the embodiments described, it should be understood that, instead of moving or dragging one of the icons onto the Web page, the user can click on or move the cursor over the icon when the Web page is displayed. If the Web page supports live action icons, some indication is displayed, either by the icon lighting up, or by some other indication, as appropriate.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method, comprising:
providing a browser tool that enables use of an active icon;
responsive to display of a Web page having a plurality of display areas, and responsive to actuation of the action icon that is part of the browser tool and not included as part of the Web page, detecting whether the Web page supports a function which can be requested by actuating the action icon; and
causing the requested function to be performed if the Web page supports the function, and the function is caused to be performed when the active icon is detected to be at least partially placed over one of the plurality of display areas of the Web page;
wherein the function is defined by the browser tool and content presented by the active icon relates to the display area over which the active icon is placed over.

2. The method of claim 1, wherein the active icon is one of a plurality of active icons provided by the browser tool, each one of the active icons defining different respective function.

3. The method of claim 2, wherein the respective functions are selected from the group consisting of:
displaying detailed information about an item shown on the Web page;
displaying a login user interface;
obtaining more information about content of the Web page;
looking for comments on the content of the Web page;
copying content of the Web page into a preference folder;
displaying a Blog page;
displaying a video clip; or
downloading a file.

4. The method of claim 3, further comprising:
receiving an instruction for buying the item; or
receiving shipping address information from the action icon; or
receiving login information from the action icon.

5. The method of claim 4, further comprising:
ending a login session when the action icon is moved out of the Web page.

6. The method of claim 1, further comprising:
causing the action icon to be further actuated when it is clicked on, and the placing of the active icon includes enabling dragging of the active icon to facilitate the placing.

7. The method of claim 1, further comprising:
causing the action icon to be further actuated when a cursor is pointed over the action icon.

8. The method of claim 1, further comprising:
lighting up at least a part of the Web page if the Web page supports the requested function.

9. The method of claim 1, wherein the browser tool is configured to be used with a plurality of websites and a plurality of browsers.

10. A method for providing additional information regarding items contained in a web page, comprising:
rendering a web page having a plurality of display areas;
rendering a graphic display of a plurality of active icons apart from the rendering of the web page, wherein one or more of the plurality of active icons are available for surfacing a respective predefined function concerning selected ones of the display areas;
detecting selection of one of the plurality of active icons, the detected selection being associated with a specific display area in the website, the detected selection further acting to cause a predefined function to generate information for the specific display area in the website;
enabling interaction with the information provided by the predefined function; and
wherein the rendered graphic display of the plurality of active icons remain when the web page is changed for other web pages during browser navigation of Internet content;
wherein the one or more of the plurality of active icons remaining available for surfacing respective predefined functions concerning selected ones of display areas in the other web pages, whereby the graphic display of the plurality of active icons not included as part of the web page or the other web pages, wherein the method is executed by a processor.

11. The method of claim 10, wherein selected ones of the active icons illustrated as active when enabled for use on the web page and the other web pages.

12. The method of claim 10, wherein the rendered graphic display is provided as one of a browser tool, or user interface, or a tool belt on a user interface, or tab of a browser, or a new browser window.

13. The method of claim 10, wherein detecting selection of one of the plurality of active icons and association with a specific display area in the website is facilitated by dragging one of the active icons over the specific display area in the website.

14. The method of claim 13, wherein the predefined function that generates information for the specific display area in the website produces a window, icons, text or combinations of windows, icons and text, and the information is interactive to receive feedback or data from a computer input provided to the active icon.

15. The method of claim 10, wherein the respective predefined functions are selected from one or a combination of two or more of:
displaying detailed information about an item shown on the Web page; or
displaying a login user interface; or
obtaining more information about content of the Web page; or
looking for comments on the content of the Web page; or
copying content of the Web page into a preference folder; or
displaying a Blog page; or
displaying a video clip; or
downloading a file.

16. A computer program product comprising a computer readable medium having program instructions for providing additional information regarding items contained in a web page, the computer readable media further comprising:
program instructions for rendering a web page having a plurality of display areas;
program instructions for rendering a graphic display of a plurality of active icons apart from the rendering of the web page, wherein one or more of the plurality of active icons are available for surfacing a respective predefined function concerning selected ones of the display areas;
program instructions for detecting selection of one of the plurality of active icons, the detected selection being associated with a specific display area in the website, the detected selection further acting to cause a predefined function to generate information for the specific display area in the website;
program instructions for enabling interaction with the information provided by the predefined function; and
wherein the rendered graphic display of the plurality of active icons remain when the web page is changed for other web pages during browser navigation of Internet content;
wherein the one or more of the plurality of active icons remaining available for surfacing respective predefined functions concerning selected ones of display areas in the other web pages, whereby the graphic display of the plurality of active icons not included as part of the web page or the other web pages.

17. The computer program product of claim 16, wherein selected ones of the active icons illustrated as active when enabled for use on the web page and the other web pages.

18. The computer program product of claim 16, wherein the rendered graphic display is provided as one of a browser tool, or user interface, or a tool belt on a user interface, or tab of a browser, or a new browser window.

19. The computer program product of claim 16, wherein detecting selection of one of the plurality of active icons and association with a specific display area in the website is facilitated by dragging one of the active icons over the specific display area in the website.

20. The computer program product of claim 16, wherein the respective predefined functions are selected from one or a combination of two or more of:
displaying detailed information about an item shown on the Web page; or
displaying a login user interface; or
obtaining more information about content of the Web page; or
looking for comments on the content of the Web page; or
copying content of the Web page into a preference folder; or
displaying a Blog page; or
displaying a video clip; or
downloading a file.

* * * * *